United States Patent
Di Giorgio et al.

(10) Patent No.: US 7,839,986 B2
(45) Date of Patent: Nov. 23, 2010

(54) PROCEDURE AND SYSTEM FOR PROCESSING IDENTIFICATION NUMBERS IN TELECOMMUNICATION NETWORKS

(75) Inventors: Vincenzo Di Giorgio, Rio de Janerio (BR); Domenico Francesco Puntillo, Rio de Janerio (BR)

(73) Assignee: Tim Italia S.p.A., Milan (IT)

( * ) Notice: Subject to any disclaimer, the term of this patent is extended or adjusted under 35 U.S.C. 154(b) by 0 days.

(21) Appl. No.: 10/565,848

(22) PCT Filed: Aug. 1, 2003

(86) PCT No.: PCT/IT03/00490

§ 371 (c)(1),
(2), (4) Date: Jul. 10, 2006

(87) PCT Pub. No.: WO2005/013593

PCT Pub. Date: Feb. 10, 2005

(65) Prior Publication Data

US 2007/0140464 A1    Jun. 21, 2007

(51) Int. Cl.
*H04M 1/56* (2006.01)
*H04M 15/06* (2006.01)
*H04W 68/00* (2009.01)

(52) U.S. Cl. ............... 379/142.01; 379/355.04; 455/460

(58) Field of Classification Search ............ 379/14.01, 379/142.04, 142.06, 210.01, 355.01–355.1, 379/121.02, 127.03, 127.05, 221.01, 221.02; 455/415, 460
See application file for complete search history.

(56) References Cited

U.S. PATENT DOCUMENTS

| 5,528,680 | A | | 6/1996 | Karpicke |
| 5,559,862 | A | * | 9/1996 | Bhagat et al. ............... 455/460 |
| 5,963,876 | A | * | 10/1999 | Manssen et al. ............ 455/564 |
| 6,009,158 | A | | 12/1999 | Romero |
| 6,137,877 | A | * | 10/2000 | Robin et al. ................ 379/352 |
| 6,154,530 | A | * | 11/2000 | Letellier ................ 379/142.06 |
| 6,542,591 | B1 | * | 4/2003 | Amro et al. ............ 379/142.01 |
| 6,542,733 | B1 | | 4/2003 | Dennis |

(Continued)

FOREIGN PATENT DOCUMENTS

GB    2 319 694 A    5/1998

(Continued)

*Primary Examiner*—Quoc D Tran
(74) *Attorney, Agent, or Firm*—Finnegan, Henderson, Farabow, Garrett & Dunner, L.L.P.

(57) ABSTRACT

A process that can be used to process the calling line presentation supplied to a called user following a call made by a calling user in a fixed and/or mobile communications network (for example, GSM, GPRS or UMTS in the latter case). A corresponding code for identifying an operator, such as a long-distance operator, which can be used by the called user for calling back the calling user, is identified, for example, during the registration of the user who is intended to act as the called user with a corresponding operator. This corresponding identification code is inserted automatically into the calling line presentation supplied to the called customer following the call made by the calling user. The call can be a voice call, a data call or a message, such as an SMS or MMS message. The called user is thus able to call back the calling user without having to insert the user's identification code to be used for calling back.

23 Claims, 2 Drawing Sheets

U.S. PATENT DOCUMENTS

| | | | |
|---|---|---|---|
| 6,597,785 B1 * | 7/2003 | Burke et al. | 379/355.08 |
| 6,829,337 B2 * | 12/2004 | Misumi | 379/93.23 |
| 6,975,708 B1 * | 12/2005 | Scherer | 379/88.22 |
| 2002/0122550 A1 * | 9/2002 | Noplock | 379/355.01 |

FOREIGN PATENT DOCUMENTS

| | | |
|---|---|---|
| WO | WO-02/058364 A2 | 7/2002 |
| WO | WO-02/062043 A1 | 8/2002 |

* cited by examiner

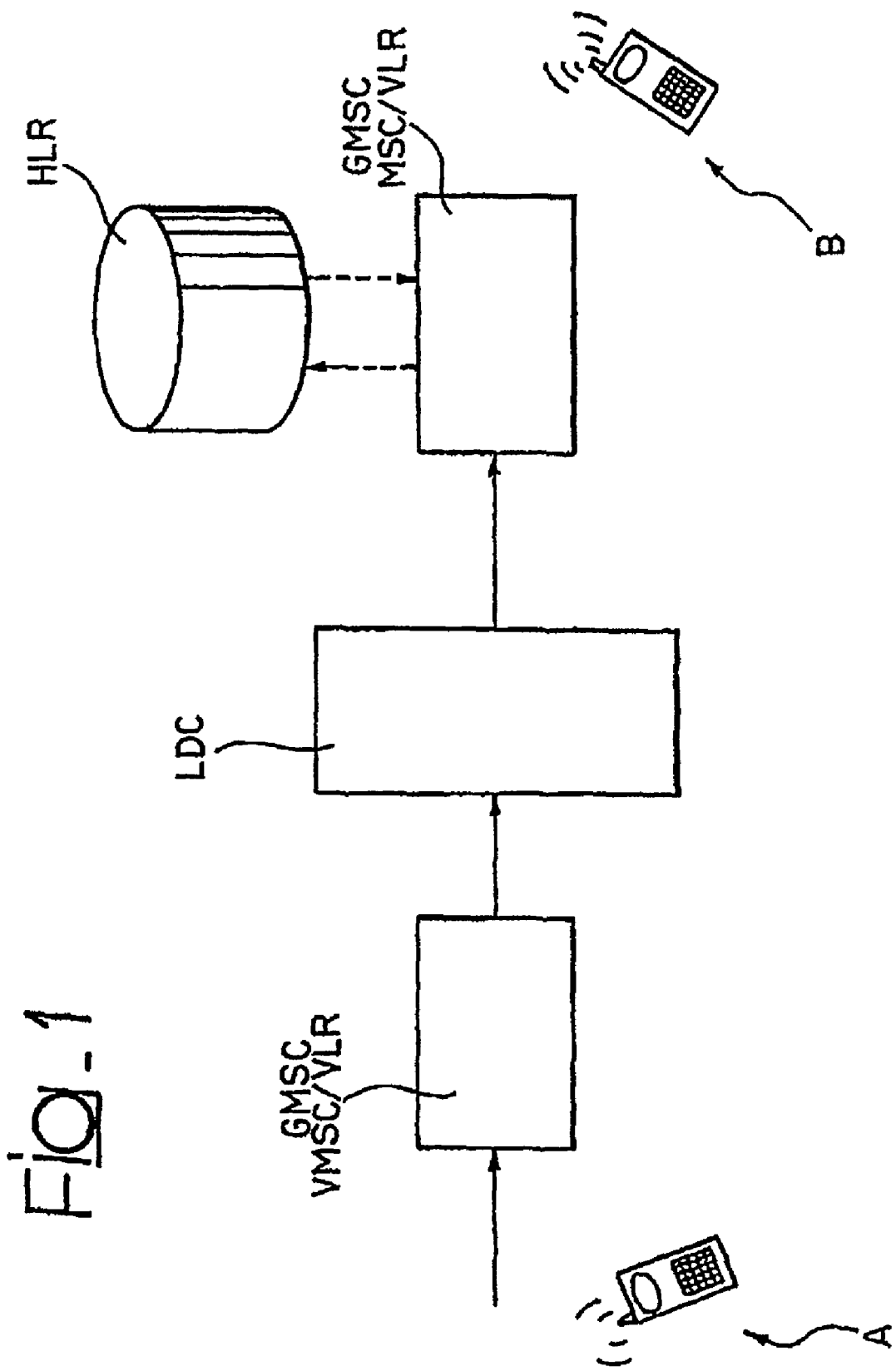

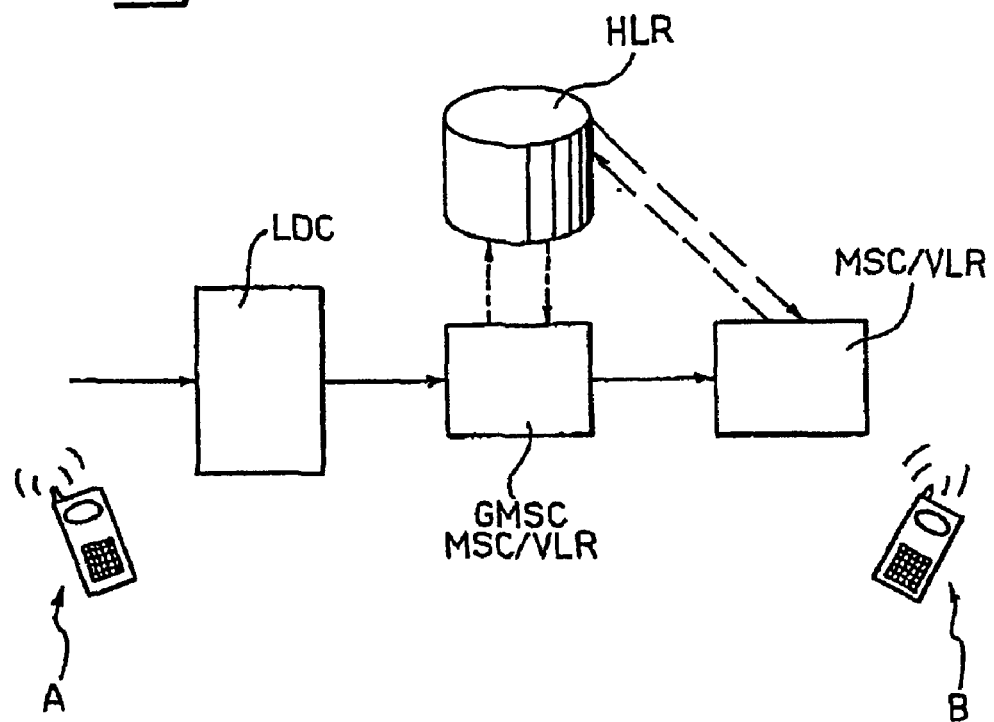
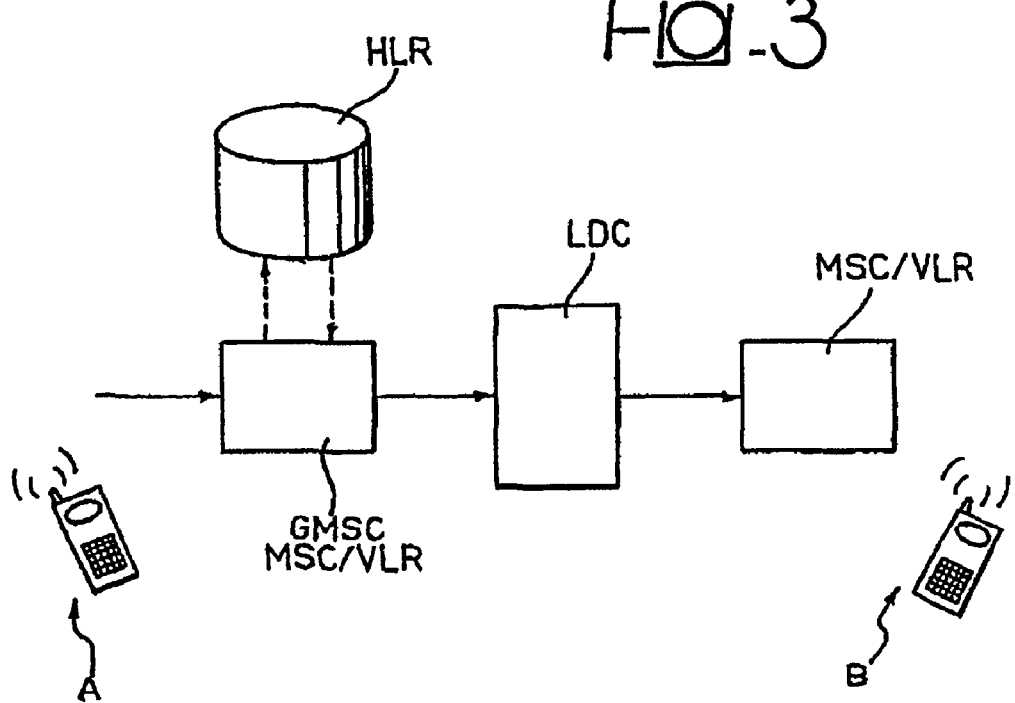

PROCEDURE AND SYSTEM FOR PROCESSING IDENTIFICATION NUMBERS IN TELECOMMUNICATION NETWORKS

CROSS REFERENCE TO RELATED APPLICATION

This application is a national phase application based on PCT/IT2003/000490, filed Aug. 1, 2003, the content of which is incorporated herein by reference.

FIELD OF THE INVENTION

The present invention relates to the techniques for processing users identification numbers in telecommunications networks.

DESCRIPTION OF THE KNOWN ART

Various applications require the processing, for example the modification and/or supplementing, of the identification numbers of users of a communications network, such as a mobile communications network.

For example, WO-A 02/058364 describes a process and equipment for processing (editing) the telephone numbers stored in an electronic directory of an electronic device. A directory editor can modify part, such as a prefix, of one or more telephone numbers stored in the directory. After the definition of a modification criterion, an old prefix and a new prefix, all the numbers stored in the directory and conforming to the modification criterion can have their old prefixes changed to the new prefix.

WO-A-02/062043 describes a system for associating a telephone call with a corresponding element in an electronic directory which can be used in a telephone. In particular, the system can identify the telephone call and provide a telephone number in reply. The system can also determine a home prefix associated with the telephone and use it together with the telephone number to associate the telephone call with a corresponding element in the directory, regardless of whether the directory contains prefixes. The call can be identified as an incoming or outgoing call, incoming calls being identified and telephone numbers being provided in reply. In particular, the numbers relating to a prefix can be associated with, and placed in front of, a number comprising only seven digits.

Additionally, U.S. Pat. No. 6,542,733 describes a solution for enabling the user to add telephone numbers to a list of profiles, specifying particular rules for the processing or routing of future calls to each number. The list in question enables users to dial only an abbreviated portion of the telephone number, while the network adds the additional digits required, such as the country, area or zone prefixes. The system can also provide a specified routing, using a preselected service provider if the call to a particular number is a trunk or long-distance call.

OBJECTS AND SUMMARY OF THE PRESENT INVENTION

The present invention is intended to solve a problem which may arise in some regulatory frameworks of the telecommunications sector in which it is stipulated that the calling user must always be able to select the operator to be used for long-distance calls. Regulations of this kind are currently in force in Brazil, for example.

Where the practical implementation is concerned, this situation gives rise to a number of problems, essentially related to the impossibility of making calls, particularly over long distances, in a standard format, unless the calling user directly inputs the details of the selected operator (carrier).

In particular, the user cannot make an immediate call back to a given number from which a call has been received: this is because the identification of the calling number (Calling Line Identity Presentation or CLIP) is received in a format which does not contain the identifier of the long-distance operator, and therefore this information must be positively input by the user in order for the call to be made.

If the caller's number is stores in a directory, many telephones simply display the caller's name, without any further information, and this has been found to cause unease on the part of the called user. This is because, when the called user attempts to call the name which has appeared in the display, he/she cannot make the call, owing to the absence of the identifier of the long-distance operator.

It will be appreciated that the impossibility of making an immediate call back is a negative characteristic affecting not only voice calls but also, for example, messaging services (SMS, MMS) and services designed to indicate to the user the calls which have been made to his/her telephone during a period in which, for example, the called telephone has been switched off.

The object of the present invention is to solve the problems outlined above, especially in respect of the possibility of permitting an immediate call back or replay in response to a received call.

According to the present invention, this object is achieved by means of a procedure whose characteristics are claimed specifically in the claims below. The invention also relates to a corresponding system, the associated network and a data processing product which can be loaded into the memory of at least one electronic computer and contains portions of software code for implementing the procedure according to the invention when the product is executed on at least one computer. The reference to "at least one computer" emphasizes, among other things, the possibility of implementing the solution described herein in a decentralized form at the network level.

In a preferred embodiment of the solution described herein, a change is made, for example, to what are known as the MSC (Mobile Switching Centers) of a mobile telephone network, such as a GSM network, by modifying what is known as the CLIP (Calling Line Identity Presentation) in such a way as to enable a calling user (user "A") to be identified by the called user ("B").

The field of application of the invention is not limited to GSM networks: the solution described here can be used in mobile networks according to any standard (for example CDMA, WCDMA, UMTS, TDMA, etc.) and also in fixed communications networks.

The CLIP identifier modified in this way enables the called user to make what is known as an immediate replay of a received call without the need to modify the number.

In a preferred embodiment of the solution described herein, it is possible to check whether the called user belongs to, and is located in, the same geographical area (in other words the area indicated by the same prefix) as the caller. If this area/prefix identity is present, it is not necessary to modify the number in the CLIP identifier, consisting for example of seven or eight digits (the local number without the prefix): this is because the called user does not need to dial a trunk dialing prefix in order to make the call back.

In other scenarios, the CLIP identifier presented to the called user is processed in such a way that it includes the long-distance or trunk operator code (in other words the code which, for example, is called CSP in the Brazilian regulations) agreed previously by the called user with his/her telephone service operator. The latter operator stores this preferred choice, for example in a field called the Preferred Interchange Code (PIC) of what is known as the Home Location Register (HLR), in association with the user's identifier. If the user does not state a specific PIC, it is possible to store a default value (for example, the long-distance code of the telephone operator with which the called user is registered as a subscriber).

It is possible to operate in such a way that the changes described above are valid only if the called user ("B") is registered in a specific network (or in a number of specific networks), while preventing the CLIP identifier from being modified if the user in question is roaming on another operator's network.

It will be appreciated that, regardless of the context in question, the changes do not generally involve the field known as the Call Detail Record (CDR), which is designed to have a debiting function and which usually contains the number of the calling user "A", who usually pays for the cost of the call. Clearly, it is also possible to operate in a different way, as explained more fully below, if the cost of any call back made by the user "B" is to be debited according to a predetermined principle.

It will be appreciated that everything that has been described and illustrated with reference to voice calls is applicable in exactly the same way to data calls, to messaging functions (for example SMS or MMS) and, in general, to all services which use the same information based on the identification of the caller for the called party's benefit.

BRIEF DESCRIPTION OF THE ATTACHED DRAWINGS

The invention will now be described, purely by way of example and without restrictive intent, with reference to the attached drawings, in which:

FIG. 1 is a functional block diagram illustrating the making of a first and a second type of call according to the solution described herein, FIG. 2 is another functional block diagram illustrating the making of a third type of call in the context described herein, and FIG. 3 is a further functional block diagram illustrating the principles of the making of a fourth type of call in the context described herein.

DETAILED DESCRIPTION OF A PREFERRED EMBODIMENT OF THE INVENTION

By its very nature, the following detailed description will necessarily contain an illustration of certain details of embodiment which, while they are preferred for the embodiment of the solution described herein in certain contexts, are not essential for the application of the invention.

To summarize, we may point out again that the solution described herein is designed to be applied principally in contexts in which, for example, the CLIP identifier of the caller is presented to the called user without the national code, for example in the case of national MSISDN (Mobile Subscriber ISDN) numbers.

In order to enable the called user to call back on a trunk (long-distance) operator's network, it is advantageous, according to the invention, to add to the number received as the CLIP the corresponding identifier (for example the code CSP, in the case of the Brazilian regulations).

In other words, the called user (denoted as user "B" above) receives, within the CLIP code which generally contains information about the calling user (user "A"), in particular the telephone number of "A", a code which is taken for example from a network data bank and is related to the called user (in other words, user "B").

This code can be a code preselected by the called user when he/she is determining his/her profile in the network of the operator to which he/she subscribes. For example, it can be a dialing code of a trunk or long-distance operator selected by the called user "B" and designed to be used by "B" to call "A" back without modifying the CLIP number received in the telephone's memory.

As stated previously, this function may not be necessary when the calling user "A" and the called user "B" are located in an area identified by the same prefix.

As stated previously, the solution described herein is also suitable for other possible applications, including those in regulatory contexts different from those of the example given. For instance, the code preselected by the user "B", to be included in the CLIP for calls made to said user "B", could be:

a billing code (for debiting the cost of the call back made by "B" according to a predetermined principle, for example), or the identification code of any operator, not necessarily a long-distance operator: an example of this could be the dialing codes of fixed network operators which can currently be activated in Italian fixed networks.

Table 1 below shows examples of some possible applications. In particular, in the table in question, the first column shows the identification number (MSISDN) of user "A" (the caller), the second column shows the area code of the location of user "B" (the called user), who is shown in this example as belonging to area 11 (MSISDN: 011-81131199), the third column, identified as CLIP, shows an example of the processing operation carried out in the context of the solution described herein, for a case where the identification code of the long-distance operator (PIC, Preferred Inter-exchange Carrier) selected by the called user is the number "15", and the fourth column shows the type of call.

TABLE 1

| MSISDN number of user "A" | Location of user "B" with MSISDN 011-8113-1199 | CLIP (PIC = 15) | Type of call |
|---|---|---|---|
| 011-62241000 | Area 11 | 62241000 | Local |
| 011-62241000 | Area 21 | 0151162241000 | Trunk roaming |
| 021-39835000 | Area 11 | 0152139835000 | Trunk |
| 021-39835000 | Area 21 | 0152139835000 | Local roaming |
| 0034-609206000 | Area 11 or 21 | 001534609206000 | International |

It will be appreciated, in particular, that in the case shown in the first line of the table, the PIC code is not inserted in the CLIP identifier, since the area to which user "A" belongs, the area to which user "B" belongs, and the location of user "B" coincide (Area 11).

This type of call is described as "local".

It should also be noted that, in the case shown in the fourth line, in which user "B" has national roaming status in the area to which user "A" belongs, the PIC is inserted into the CLIP identifier. In this case, in which the use of the PIC is not strictly necessary, the aim is to facilitate call back when user "B" returns to the area to which he/she belongs.

This type of call is described as "local roaming".

The decision whether or not to display the PIC in the CLIP for local calls and for local roaming calls respectively may be different from that shown in the example in the table, since a call back can be made either with or without the aid of the long-distance operator. The application is flexible and enables this code to be displayed or concealed in each case.

FIGS. 1 to 3 all refer to the same functional event, namely a call made by a calling user ("A") to a called user ("B").

The acronyms shown in the figures identify the corresponding network components, particularly the components of mobile telephone networks such as GSM, GPRS, CDMA, TDMA or third generation networks (for example UMTS or WCDMA), as explained briefly below:

MSC=Mobile Switching Center, in other words the network element responsible for connections to the terminal, for example by circuit switching of the voice channels, HLR=Home Location Register, in other words the application which acts as the central repository of profiles of user terminals of the (mobile or fixed) network, and which stores the positions (in the case of a mobile network) and status of the terminals, VLR=Visitor Location Register, in other words the application executed at the MSC which contains a temporary copy of the profiles of the terminals, obtained from the HLR, LDC=Long Distance Call, in other words a long-distance or trunk call.

GMSC=Gateway Mobile Switching Center.

We repeat that the term "call" used herein can denote either a voice call or a data call, or the sending of a message such as an SMS (Short Message Service) or MMS (Multimedia Message Service) message.

During the registration process, the MSC centre stores the PIC code in the user's profile. The PIC code contains the dialing code of the operator to be added to the CLIP identifier.

If the MSC (Mobile Switching Center) does not receive the information relating to the PIC code during the registration process, a default value is inserted into the user's profile. In particular, it is possible to use a default PIC code, for example one identifying the operator to whose service the called user subscribes.

In a first case, FIG. 1 refers to a long-distance call made to a mobile network user "B" by a user "A" connected to the Public Switched Telephone Network (PSTN) or to a mobile network, such as a Brazilian mobile network which operates in the mode called SMP (an acronym for Servico Móvel Pessoal, i.e. Personal Mobile Service).

In particular, it is assumed that the called user "B" is in the "home" condition, and therefore, on receiving the call, he/she is connected to the MSC which is co-located with his/her "home" GMSC.

In this case, the CLIP identifier is presented, according to the known art, in the national format, in other words, in the case of the terminology used in the Brazilian regulations, in the 0 CN-A CAU-A format, where CN-A and CAU-A indicate, respectively, the national code (area prefix) of user "A" and the access code (telephone number) of the same user.

On the other hand, in the solution described here the format for presentation to the called user "B" is as follows: 0 CSP-B CN-A CAU-A, where the code CSP-B corresponds to the PIC code selected by user "B" and stored in the corresponding HLR.

With this information available, user "B" will therefore be able to replay the call immediately and automatically.

FIG. 1 can also refer to a call of the same kind as that described above, but with the difference that the call is made by a user of a network operating in SMC mode (acronym for Servico Móvel Celular, i.e. Cellular Mobile Service).

In this case, user "A" does not need to dial the CSP code to identify the long-distance operator in order to call user "B" (who is again assumed to be in the "home" condition), since in SMC mode networks the operator, rather than the user, is responsible for selecting the long-distance code.

In the example, however, the CLIP identifier presented to user "B" has the format 0 CSP-B CN-A CAU-A in this case also.

On the other hand, FIGS. 2 and 3 refer to typical roaming scenarios.

In particular, FIG. 2 refers to the situation in which user "B" is connected to a visited MSC (or VMSC), which is co-located with, in other words located in the same area as, his/her "home" GMSC, and therefore the interaction between the two MSCs does not require a long-distance call (LDC) function.

FIG. 3, on the other hand, refers to a situation in which user "B" is connected to a visited MSC (VMSC) located in a roaming area (RA) different from his/her "home" area, and therefore in this case it is necessary to make use of a function for a long-distance call from the "home" GMSC to user "B" via the operator (CSP) selected previously by user "B", and also for any necessary long-distance call (not shown in the figure) between user "A" and the GMSC (via the operator (CSP) selected previously by user "A").

The format of the number used to route the call between the two MSCs involved differs between these two cases. In the first case (FIG. 2), a typical Mobile Station Roaming Number (MSRN) format is used, without an additional long-distance operator (CSP) code, while, in the second case, according to the same system used previously and according to the Brazilian regulations, the format is 0 CSP-B MSRN, since the long-distance operator of user "B" is involved.

The examples considered above refer only to situations in which user "B" has to dial a code (CSP) to call back with a call which involves a long-distance operator.

The example in FIG. 2 refers to the case in which user "B" is roaming in the area corresponding to his/her "home" area. In this case, the visited MSC does not receive any CSP prefix, but the invention still enables the user "B" to receive the CLIP presentation in the format 0 CSP-B CN-A CAU-A in which, as in the preceding cases, CSP-B represents the PIC code selected by user "B".

In the case shown in FIG. 3, however, user "B" is roaming in an area different from his/her "home" area. Consequently, the call is carried on a long-distance line LDC and the CSP code received by the visited MSC is the code corresponding to CSP-B. In this case also, the invention causes the CLIP presentation for user "B" to have the format 0 CSP-B CN-A CAU-A in which the code CSP-B represents the PIC identifier of user "B" obtained from the Home Location Register (HLR).

The concepts outlined above also make it clear that, when user "B" (in other words the called user) subscribed in a given area is roaming in the area of user "A" (in other words the caller), he/she could simply dial the code of "A" (with seven or eight digits, for example) in order to call back, since this is a local call (although made while roaming).

In this case, the invention may cause the CLIP to be presented to user "B" in the format 0 CSP-B CN-A CAU-A, in order to permit the storage of the number of user "A", complete with the PIC.

As indicated previously, in the case of a true local call (in other words one made between two users located in the same area) the called user "B" receives a CLIP presentation which does not contain the code CSP-B.

In the case of calls (local and long-distance) generated by international roaming users, and international calls (in other words, those generated in other countries), the CLIP presentation for user "B" will have the format 00 CSP-B CN-A CAU-A, in other words with the insertion of the code CSP-B, preceded by the international identifier 00, as shown in the example in the fifth line of Table 1. In this case, the code CN-A of the calling user will typically contain, in addition to the area code, the national code of the caller's country, 34 in the example.

Clearly, provided that the principle of the invention is retained, the details of application and the forms of embodiment can be varied considerably from what has been described and illustrated, without departure from the scope of the present invention as defined in the attached claims.

The invention claimed is:

1. A method for processing a calling line identity presentation supplied by a communications network to a called user following a call made by a calling user to the called user in said communications network, comprising the steps of:
    selectively identifying an identification code associated with a long-distance code used by said called user for calling back said calling user, wherein the identification code is associated with the called user by a long-distance operator prior to the call and stored in the communication network by the long-distance operator; and
    inserting said identification code into said calling line identity presentation supplied by said communications network to said called user following the call made by said calling user.

2. The method of claim 1, wherein an operator which can be used by said called user for calling back said calling user is associated with said identification code.

3. The method of claim 2, wherein said operator which can be used by said called user is a long-distance operator.

4. The method of claim 1, wherein the step of inserting said identification code into said calling line identity presentation is omitted when said call made by said calling user to said called user is a local call.

5. The method of claim 1, comprising the step of omitting said operation of inserting said identification code into said calling line identity presentation when said calling user and said called user are served by the same area prefix.

6. The method of claim 1, further comprising the step of including a billing code in said identification code.

7. The method of claim 1, comprising the step of identifying said operator which can be used by said called user for calling said calling user as the operator with which the called user is registered as a subscriber.

8. The method of claim 2, comprising the step of identifying said operator which can be used by said called user for calling said calling user as a default operator in the absence of any selection made previously by said called user.

9. The method of claim 1, wherein said call made by a calling user to said called user is selected from the group consisting of voice calls, data calls and message transmission.

10. The method of claim 1, applied to a mobile communications network, in which users who can act as called users are served by a corresponding Home Location Register, comprising the step of storing said identification code which can be inserted into said calling line identity presentation in said corresponding Home Location Register.

11. The method of claim 1, applied to a mobile network whose users who can act as called users are provided with a roaming facility, comprising the step of inserting said identification code into said calling line identity presentation even when said called user is in a roaming state.

12. A system for processing a calling line identity presentation supplied by a communications network to a called user following a call made by a calling user to the called user in said communications network, comprising:
    an operator function which can be used by said called user for calling back said calling user, said operator function have an identification code associated with a long-distance code, wherein the identification code is associated with the called user by a long-distance operator prior to the call and stored in the communication network by the long-distance operator; and
    at least one insertion module for inserting said identification code into said calling line identity presentation supplied by said communications network to said called user following the call made by said calling user.

13. The system of claim 12, wherein said operator function which can be used by said called user, is a long-distance operator function.

14. The system of claim 12, wherein said at least one insertion module is configured to be disabled when said call made by said calling user to said called user is a local call.

15. The system of claim 12, wherein said at least one insertion module is configured to be disabled when said calling user and said called user are served by the same area prefix.

16. The system of claim 12, wherein said at least one insertion module is configured to include a billing code in said identification code.

17. The system of claim 12, wherein said at least one insertion module is configured to identify the operator function which can be used by said called user to call back said calling user as a code of the operator with which the called user is registered as a subscriber.

18. The system of claim 12, wherein said at least one insertion module is configured to identify said operator function which can be used by said called user to call back said calling user as the code of a default operator in the absence of a selection made previously by said called user.

19. The system of claim 12, wherein said call made by a calling user to said called user is selected from the group consisting of voice calls, data calls and message transmission.

20. The system of claim 12, associated with a mobile communications network, in which the users who can act as called users are served by a corresponding Home Location Register, and said identification code which can be inserted into said calling line identity presentation is stored in said corresponding Home Location Register.

21. The system of claim 12, associated with a mobile communications network, in which the users who can act as called users are provided with a roaming facility, and at least one insertion module is configured to insert said identification code into said calling line identity presentation even when said called user is in a roaming state.

22. A communications network, comprising the system in any one of claims 12 to 21.

23. A computer readable medium encoded with a computer program product directly loadable into a memory of at least one electronic computer and which comprises portions of software code for implementing the method as claimed in any one of claims 1 to 11.

* * * * *